(12) United States Patent
Hammad et al.

(10) Patent No.: US 11,901,598 B2
(45) Date of Patent: Feb. 13, 2024

(54) INCREASING REACTANT UTILIZATION IN FE/V FLOW BATTERIES

(71) Applicant: Saudi Arabian Oil Company, Dhahran (SA)

(72) Inventors: Ahmad D. Hammad, Dhahran (SA); Issam T. Amr, Al Khobar (SA); Zhenguo Yang, Bellevue, WA (US); Yueqi Liu, Mukilteo, WA (US)

(73) Assignee: Saudi Arabian Oil Company, Dhahran (SA)

( * ) Notice: Subject to any disclaimer, the term of this patent is extended or adjusted under 35 U.S.C. 154(b) by 69 days.

(21) Appl. No.: 17/651,116

(22) Filed: Feb. 15, 2022

(65) Prior Publication Data

US 2023/0261233 A1 Aug. 17, 2023

(51) Int. Cl.
| | |
|---|---|
| *H01M 8/18* | (2006.01) |
| *H01M 4/96* | (2006.01) |
| *H01M 8/0258* | (2016.01) |
| *H01M 8/04186* | (2016.01) |
| *H01M 8/04082* | (2016.01) |

(52) U.S. Cl.
CPC ............ *H01M 8/188* (2013.01); *H01M 4/96* (2013.01); *H01M 8/0258* (2013.01); *H01M 8/04186* (2013.01); *H01M 8/04216* (2013.01)

(58) Field of Classification Search
CPC ...... H01M 8/188; H01M 4/96; H01M 8/0258; H01M 8/04186; H01M 8/04216
See application file for complete search history.

(56) References Cited

U.S. PATENT DOCUMENTS

| | | | |
|---|---|---|---|
| 9,559,375 B2 | 1/2017 | Savinell et al. | |
| 2011/0223450 A1* | 9/2011 | Horne | B60L 53/30 429/72 |

(Continued)

FOREIGN PATENT DOCUMENTS

| | | |
|---|---|---|
| CN | 103700872 | 4/2014 |
| CN | 107863536 | 3/2020 |

OTHER PUBLICATIONS

Li et al., "Fe/V redox flow battery electrolyte investigation and optimize," Journal of Power Sources, May 2013, 5 pages.

(Continued)

*Primary Examiner* — Stewart A Fraser
(74) *Attorney, Agent, or Firm* — Fish & Richardson P.C.

(57) ABSTRACT

A method and a system for using flow cell batteries with mixed Fe/V electrolytes are provided. An exemplary method includes flowing an anolyte through a first channel in an electrochemical cell, wherein the first channel is formed in the space between an anode current collector and an ion exchange membrane. A catholyte is flowed through a second channel in the electrochemical cell, wherein the second channel is formed in the space between a cathode current collector and the ion exchange membrane, wherein the first channel and the second channel are separated by an ion exchange membrane, and wherein the catholyte includes a mixed electrolyte including both iron and vanadium ions. Ions are flowed through the ion exchange membrane to oxidize the anolyte and reduce the catholyte. An electric current is generated between the anode current collector and the cathode current collector.

19 Claims, 9 Drawing Sheets

(56) References Cited

U.S. PATENT DOCUMENTS

| | | | |
|---|---|---|---|
| 2012/0077068 A1* | 3/2012 | Wang | H01M 8/20 429/105 |
| 2021/0083309 A1 | 3/2021 | Hammad et al. | |
| 2021/0399323 A1 | 12/2021 | Hammad et al. | |
| 2023/0261232 A1 | 8/2023 | Hammad et al. | |

OTHER PUBLICATIONS

PCT Invitation to Pay Fees and, where applicable, Protest Fee in International Appln. No. PCT/US2023/013022, dated May 19, 2023, 13 pages.

U.S. Appl. No. 17/671,948, Hammad et al., filed Feb. 15, 2022.

Li et al, "A new iron/vanadium (Fe/V) redox flow battery," Electrical Energy Storage Applications and Technologies (EESAT) 2011, Biennial International Conference, Oct. 16-19, 2011, 4 pages.

Sánchez-Díez at al., "Redox flow batteries: Status and perspective towards sustainable stationary energy storage," Journal of Power Sources, 2021, 23 pages.

PCT International Search Report and Written Opinion in International Appln No. PCT/US2023/013022, dated Aug. 1, 2023, 20 pages.

PCT International Search Report and Written Opinion in International Appln. No. PCT/US2023/013021, dated Aug. 1, 2023, 14 pages.

Wang et al., "A new hybrid redox flow battery with multiple redox couples," Journal of Power Sources, 2012, 216:99-103, 5 pages.

Xu et al., "Modeling the effect of temperature on performance of an iron-vanadium redox flow battery with deep eutectic solvent (DES) electrolyte," 2020, 449:227491, 10 pages.

Zhao et al., "Performance improvement of non-aqueous iron-vanadium flow battery using chromium oxide-modified graphite felt electrode," Ionics, 2021, 27:4315-4325, 11 pages.

\* cited by examiner

INCREASING REACTANT UTILIZATION IN FE/V FLOW BATTERIES

TECHNICAL FIELD

The present disclosure is directed to increasing the reactant utilization and energy density in Fe/V mixed chloride and sulfonate flow batteries.

BACKGROUND

Energy storage is increasingly demanded in the deployment of renewable energy resources and the improvement of the electrical grid reliability and efficiency. It is considered a critical enabler to the transformation from current fossil economy to zero-carbon one.

Nearly all the countries in the Middle East and North Africa (MENA) region are blessed with abundant renewable energy sources due to its unique geographical location. For example, the direct solar radiation (insolation) in the MENA region exceeds 6 kWh/m$^2$. However, the renewables are intermittent, requiring large-scale energy storage systems for continuous and reliable power output. The overall development plan should adopt and focus on the right energy storage technologies that would suit the needs and climate in the MENA region. Long duration batteries that have capacities up to multi-megawatt levels, such as flow batteries, are considered a suitable option for shifting this large power in time as needed.

A flow battery is an energy storage technology that stores power as chemical energy in flowing solutions from separate storage tanks, termed catholytes and anolytes. Flow batteries are among the most promising storage options and have the potential to be cheaper and more flexible than other competitors, for example, due to their low cost and scalability. In a flow battery, the electrolytes are circulated through electrochemical cells, where they are separated by an ion exchange membrane (IEM). Electricity is converted to chemical energy in the electrochemical cells for storage, and then released during discharge. Unique to flow batteries is the ability to independently vary energy and power capacity. Energy capacity is defined by the volume of the electrolyte stored in the tanks and the concentration of redox couple species, whereas the power rating is defined by the size of electrodes and the number of cells in a stack.

SUMMARY

An embodiment described in examples herein provides a flow cell battery. The flow cell battery includes an electrochemical cell, wherein the electrochemical cell includes an ion exchange membrane, an anode current collector, and a cathode current collector. A space between the ion exchange membrane and the anode current collector forms a first channel, and a space between the ion exchange membrane and the cathode current collector forms a second channel. The ion exchange membrane is configured to allow ions to pass between the first channel and the second channel. The flow cell battery includes a first tank configured to flow an anolyte through the first channel at a first rate, and a second tank configured to flow a catholyte through the second channel at a second rate. The catholyte, or both the catholyte and the anolyte, includes a mixture of iron and vanadium ions.

Another embodiment described in examples herein provides a method of producing electric current. The method includes flowing an anolyte through a first channel in an electrochemical cell, wherein the first channel is formed in the space between an anode current collector and an ion exchange membrane. A catholyte is flowed through a second channel in the electrochemical cell, wherein the second channel is formed in the space between a cathode current collector and the ion exchange membrane, wherein the first channel and the second channel are separated by an ion exchange membrane, and wherein the catholyte includes a mixed electrolyte including both iron and vanadium ions. Ions are flowed through the ion exchange membrane to oxidize the anolyte and reduce the catholyte. An electric current is generated between the anode current collector and the cathode current collector.

DETAILED DESCRIPTION

Examples described herein provide a flow cell battery that utilizes an electrolyte mixture of iron and vanadium ions as both anolyte and catholyte. The charging voltage is increased to 1.6 V from 1.4 V to increase the energy density.

Specifically, the higher charging voltage oxidizes a portion of the V$^{4+}$ ions in the catholyte to form V$^{5+}$ ions. During charging, Fe$^{2+}$ ions in the catholyte are oxidized to Fe$^{2+}$ at voltages up to 1.4 V, at the higher voltages the V$^{4+}$ ions are oxidized to form V$^{5+}$ ions.

However, as described herein, higher temperatures can lead to the precipitation of compounds of V$^{5+}$. The precipitation of these compounds occurs at positive side of the battery, and starts at about 40° C. at a 100% ratio of the V$^{5+}$ ions. This causes damage to the flow cell battery. The damage may be prevented by limiting the concentration of the ratio of V$^{5+}$ ions to V$^{4+}$ ions, as described with respect to Table 1.

The data in Table 1 shows stability tests of the battery at ratios of about 50%, about 60%, about 70% and about 80% V$^{5+}$ ions to V$^{4+}$ ions at temperatures above about 40° C., such as about 55° C. and about 60° C. Testing at about 60°

C. indicates that the concentration ratio of $V^{5+}$ ions to $V^{4+}$ ions is reduced to about 60%, at which the flow cell battery shows stable behavior.

TABLE 1

Stability tests at different concentration ratios of $V^{5+}$ to $V^{4+}$

| | Electrolyte Sample | | | |
|---|---|---|---|---|
| | Catholyte (#1) | Catholyte (#2) | Catholyte (#3) | Catholyte (#4) |
| | 1.25M $Fe^{3+}$ | 1.25M $Fe^{3+}$ | 1.25M $Fe^{3+}$ | 1.25M $Fe^{3+}$ |
| Electrolyte | 0.625M $V^{4+}$ (50%) | 0.50M $V^{4+}$ (40%) | 0.375M $V^{4+}$ (30%) | 0.25M $V^{4+}$ (20%) |
| Temperature | 0.625M $V^{5+}$ (50%) | 0.75M $V^{5+}$ (60%) | 0.875M $V^{5+}$ (70%) | 1.0M $V^{5+}$ (80%) |
| 55° C. | Stable (30 days) | Stable (25 days) | Stable (25 days) | Not Stable (>11 days) |
| 60° C. | Stable (30 days) | Stable (25 days) | Not Stable (8 days) | Not Stable (>4 days) |

Accordingly, in embodiments described herein, the amount of the $V^{5+}$ ions formed in the catholyte is controlled to ensure that no more than about 50% to about 60% of the $V^{4+}$ ions are converted to $V^{5+}$ ions. Limiting the proportion of the $V^{5+}$ ions to less than about 60% of the total vanadium ions present decreases the possibility of precipitation of the $V^{5+}$ ions at operating temperatures of up to about 40° C., and increases the temperature range to meet operating requirements in hot environments, such as countries in the Middle East and North Africa (MENA). Additionally, the iron ions are more stable at higher temperatures than the vanadium ions, and thus, the presence of the iron ions does not affect the stability of the electrolytes.

To take advantage of the increased energy density, the ratio of anolyte to catholyte is changed to 3:2 from 1:1, which improves the reactant utilization of the ions in the catholyte. During discharge, the $V^{5+}$ ions in the catholyte are reduced to $V^{4+}$ ions first, after which the $Fe^{3+}$ ions are reduced to $Fe^{2+}$. In the anolyte, the iron ions do not participate in the reaction, which uses a $V^{3+}/V^{2+}$ half-cell.

Thus, higher energy density batteries can be made that are stable at the higher temperatures. As iron is lower in cost than vanadium, it also reduces the capital cost of the Fe/V mixed acid flow batteries.

Figure 1:
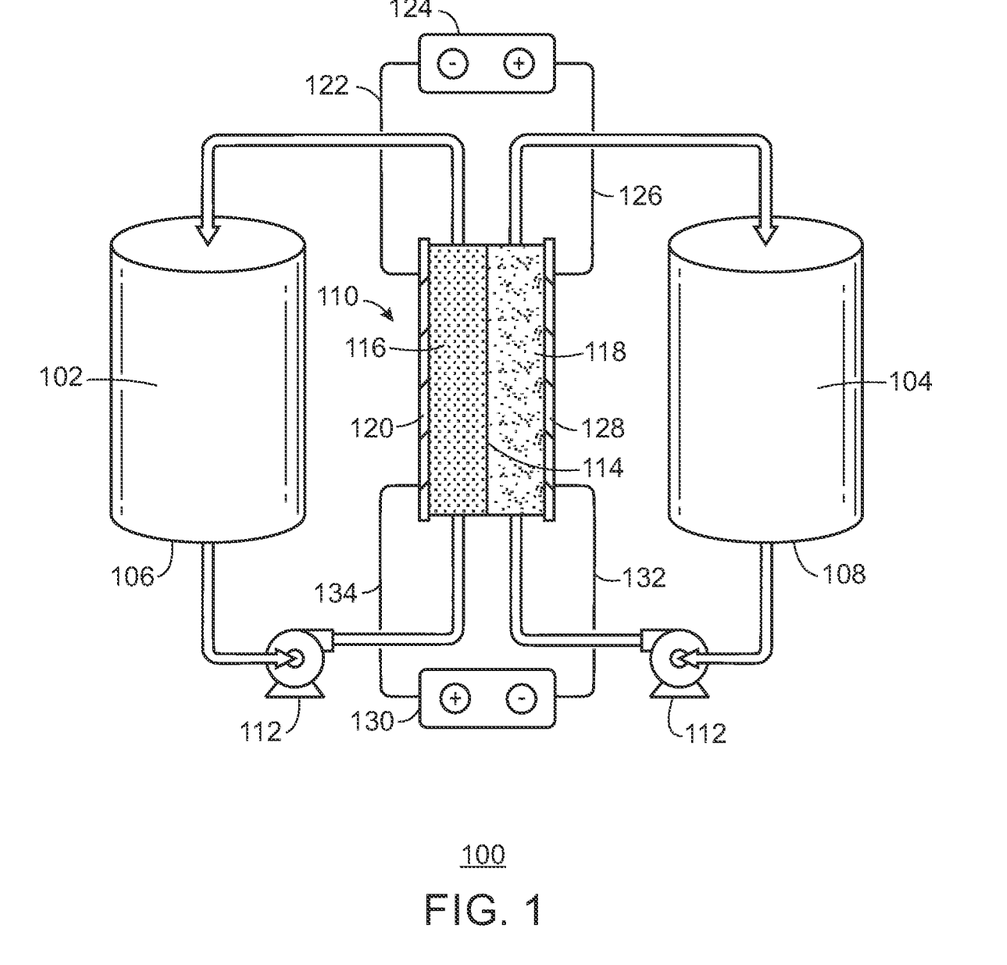
FIG. 1 is a drawing of a flow battery using two electrolytes.

FIG. 1 is a drawing of a flow battery 100 using two electrolytes. In the flow battery 100, the energy is stored in electrolytes 102 and 104, which are termed anolyte 102 and catholyte 104, herein. The electrolytes 102 and 104 are stored in tanks 106 and 108 and are separately pumped from the tanks 106 and 108 to an electrochemical cell 110 by dedicated pumps 112.

In some embodiments, an ion exchange membrane 114 is used in the electrochemical cell 110. The ion exchange membrane 114 separates the electrolytes 102 and 104 to prevent energy loss by short-circuiting, while allowing protons, or other ions, to pass between the sides during charge and discharge cycles and maintain electroneutrality. In some embodiments, the ion exchange membrane 114 is a sulfonated tetrafluoroethylene, for example, commercially available under the NAFION® name from DuPont Chemical of Wilmington Virginia. The ion exchange membrane 114 generally controls the efficiency of the flow battery 100, and is a significant contributor to the cost of the flow battery 100. Accordingly, in some embodiments, the ion exchange membrane 114 is omitted and the electrolytes 102 and 104 are generally kept from mixing by laminar flow or is made unnecessary by battery design, such as if a single electrolyte solution is used.

As the electrolytes 102 and 104 are pumped through the electrochemical cell 110, they pass through channels 116 and 118. The channels 116 and 118 may include a porous electrode material, such as felt, or Rainey nickel, among others, to allow ions and electrons to flow between the electrolytes 102 and 104. In some embodiments, for example, when the ion exchange membrane 114 is omitted, the channels 116 and 118 may be narrow to enhance laminar flow.

During the production of power, ions in the anolyte 102 are oxidized, losing electrons to the anode current collector 120. The electrons are transferred by a line 122 to a load 124. After powering the load 124, the electrons are returned to the electrochemical cell 110 by another line 126. The electrons reenter the electrochemical cell 110 from the cathode current collector 128, reducing ions in the catholyte 104.

One of the most established technologies for flow batteries is based on vanadium redox chemistry and is termed the vanadium redox flow battery (VFB). In VFBs, vanadium ions are dissolved in an aqueous acid supporting electrolyte. VFBs are often based on $V^{2+}/V^{3+}$ and $V^{4+}/V^{5+}$ redox couples.

For a vanadium ion flow cell battery, during discharge, the reaction of the anolyte 102 at the anode current collector 120 is shown in equation 1.

$$V^{2+} \rightarrow V^{3+} + e^-, E^0 = -0.25 \text{ V Vs SHE} \tag{1}$$

During discharge, the reaction of the catholyte 104 at the cathode current collector 128 is shown in equation 2.

$$VO_2^+ + 2H^+ + e^- \rightarrow VO^{2+} + H_2O, E^0 = +1.01 \text{ V Vs SHE} \tag{2}$$

The anolyte 102 and catholyte 104 are regenerated during a charging cycle. During the charging cycle a power source 130 removes electrons from the cathode current collector 128 through a line 132, oxidizing ions in the catholyte 104 to an initial state, for example, in the reverse of equation 2. The electrons are provided to the anode current collector 120 from the power source 130 through another line 134, reducing ions in the anolyte 102 to an initial state, for example, in the reverse of equation 1.

In VFBs, the vanadium ions are dissolved in an aqueous acid supporting electrolyte. Since the first demonstration of VFB, several studies have been carried out in order to investigate the effects of various electrochemical, chemical, and physical variables to optimize the related system operation parameters with negligible capacity reduction.

Although VFBs are currently being used commercially, there are problems associated with their performance at temperatures greater than about 40° C., where $V^{5+}$ ions tend to precipitate, damaging the flow battery. These problems may limit their use in hot environments, such as the MENA countries.

Accordingly, a flow battery based on Fe/V redox chemistry is provided herein as an option for lowering costs for large-scale energy storage, as the utilization of Fe ions in the positive side instead of $V^{5+}$ ions potentially leads to a significant improvement in operation temperature window over all Vanadium flow batteries. Further, iron is lower cost than vanadium lower the material cost of the flow batteries.

In an Fe/V flow battery, during the discharge cycle of the flow battery, the catholyte 104 includes $Fe^{3+}$ which is reduced to $Fe^{2+}$ at the cathode current collector 128 (+), while the anolyte 102 includes $V^{2+}$ which is oxidized to $V^{3+}$ at the anode current collector 120 (−), according to the reactions shown below:

$$Fe^{3+} + e^{3 1} \rightarrow Fe^{2+}, E_{Fe,298\ K}^{0} = 0.769V \quad (3)$$

$$V^{2+} \rightarrow V^{3+} + e^{-}, E_{V,298\ K}^{0} = -0.260V \quad (4)$$

$$Fe^{3+} + V^{2+} \rightarrow V^{3+} + Fe^{2+}, E_{298\ K}^{0} = 1.029V \quad (5)$$

However, Fe/V flow batteries may be difficult to commercialize. Cross contamination of the two half-cell electrolytes due to the passage of iron and vanadium ions across the membrane can lead to discharge decay, lowering the lifespan of the electrolytes.

Further, Fe/V redox flow batteries have a lower energy density than VFB systems, due to lower cell operating voltage across the cathode and anode, and inefficient utilization of the reactants in the catholyte 104. This is generally due to a lower reactant concentration in the electrolyte than in VFBs. Fe ions have a low solubility in hydrochloric acid and sulfate acid that limits the total concentration of the Fe and V ions in the Fe/V/HCl cell to about 1.5 mol $L^{-1}$.

Figure 2:
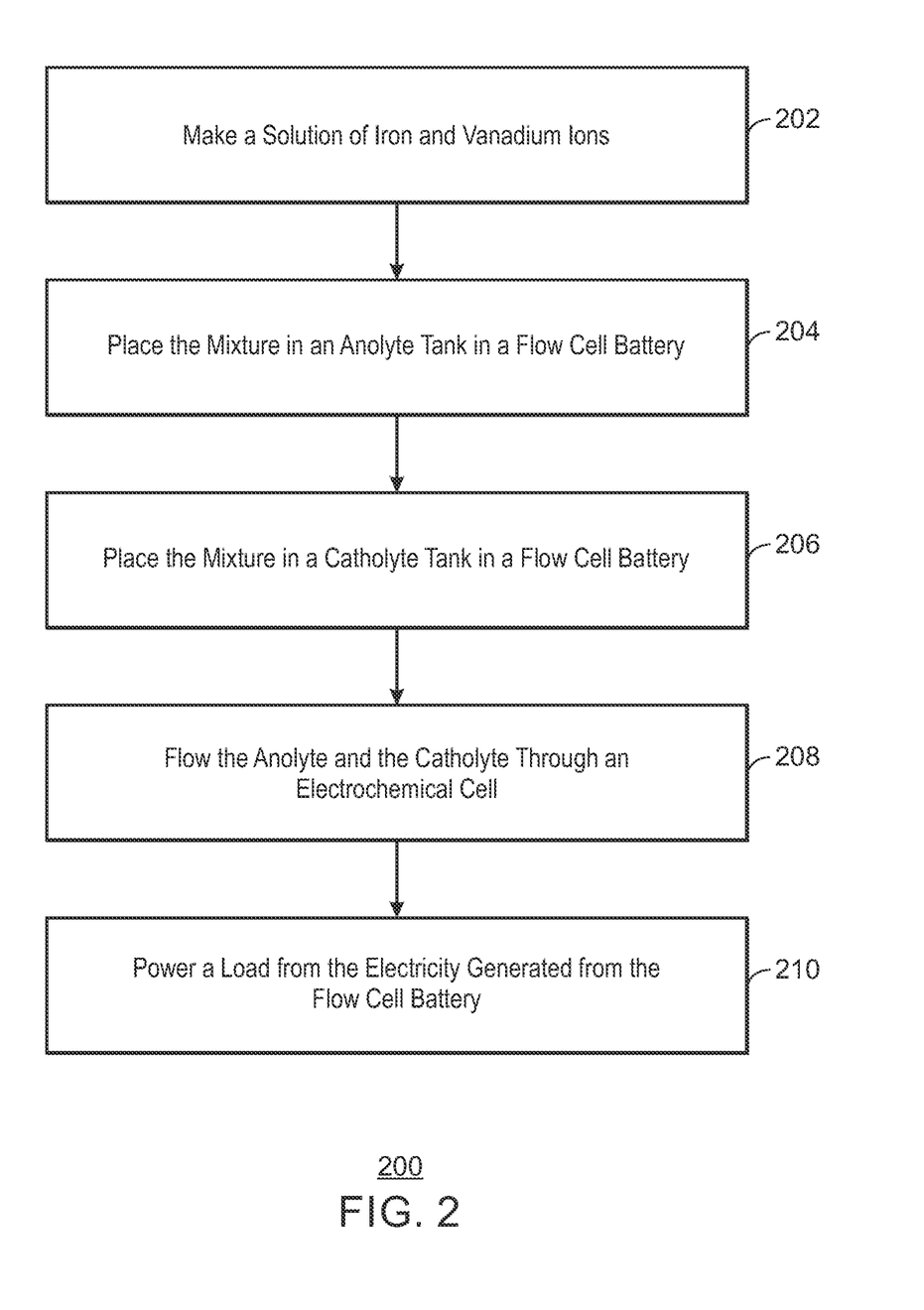
FIG. 2 is a method for operating an Fe/V flow cell to obtain higher energy density.

FIG. 2 is a method 200 for operating an Fe/V flow cell to obtain higher energy density. The method begins as block 202 with the preparation of a solution of iron and vanadium ions. This may be performed by dissolving iron metal in a strong acid, such as concentrated HCl, for example, to form a solution at a maximum concentration of 1.5 M based on solubility. Vanadium metal is then dissolved in the acid, for example, to form a mixed ion solution that has about 1.5 M vanadium ions, in addition to the Fe ions.

At block 204, an anolyte tank in a flow cell battery is filled with the mixed ion solution. At block 206, a catholyte tank is filled with the mixed ion solution.

At block 208, the anolyte and the catholyte are flowed through an electrochemical cell to generate electricity. In embodiments described herein, the power output is controlled by the total charge voltage and the volume ratio of the catholyte to the anolyte, for example, at a 2:3 ratio of catholyte to anolyte. This may be adjusted by controlling the flow rate through the electrochemical cell. At block 210, a load is powered from the electricity generated from the flow cell battery.

The utilization of a $V^{4+}/V^{5+}$ half-cell reaction, in addition to the $Fe^{2+}/Fe^{3+}$ half-cell reaction, on the positive side, i.e., in the catholyte, of a mixed V/Fe chloride/sulfide flow cell battery allows the energy density of the Fe/V flow cell battery to be increased by about 30%, for example, due to the optimization in volume ratio by flow rate. As described with respect to FIGS. 5 and 6, the ratio 3:2 of the flow rate, or volume, of the catholyte to the anolyte utilizes both $Fe^{2+}$ ions and $V^{4+}$ ions in the catholyte. The improvements in energy density and reagent utilization may reduce the capital cost of the Fe/V mixed acid flow batteries by 25% to 30%, or more. Further, the high tolerance for high temperatures, such as 40° C. or higher, over a VFB, due to the 60% limit placed on the conversion of $V^{4+}$ to $V^{5+}$. This allows the flow cell battery to meet operational requirements in the MENA region.

EXAMPLES

Experimental

Preparation of Electrolyte

A mixed ion solution including Fe and V ions was prepared as described herein. The mixed reactant solution included 1.25-1.5 M Fe/1.25-1.5 M V with 6.6-8.6 M Cl⁻. The preparation was performed by dissolving 1.25-1.5 M Iron(II) chloride ($FeCl_2$) powder into a 6.6-8.6 M Hydrochloric acid (HCl) solution at ambient temperature (20-25° C.), then stirring for 24 hours.

After that time, a mixture of $V_2O_3$ and $V_2O_5$ at a 50/50 molar ration was added to the $FeCl_2$ solution. The solution was heated to 60° C. and stirred for 12 hours. The resulting electrolyte solution is $V^{3.5+}/Fe^{2+}$ mixed solution, comprised of 50% of $V^{4+}$ and 50% of $V^{3+}$ plus $Fe^{2+}$ solution.

Electrochemical Test Cell

The mixed reactant solution was used in an electrochemical test cell battery as both the catholyte and anolyte. Even though these solutions are not flowing, the terms catholyte and anolyte are retained for consistency. Referring to FIG. 1, the catholyte 104 is on the positive side during discharge, accepting electrons from the load, and the anolyte 102 is on the negative side during discharge, providing electrons to the load. The volume proportions were determined by the amount added to each side of the test cell. The test cell was separated by a sulfonated polytetrafluoroethylene membrane, available from Chemours of Wilmington, DE, USA under the Nafion® brand.

Example 1: Mixed Fe/V Electrolyte with a Vanadium Utilization in the Catholyte of 0%

An initial test used a charging voltage of 1.4 V and a 1:1 volume ratio of catholyte to anolyte. Using this charging voltage, only the iron ions in the catholyte react and only the vanadium ions in the anolyte react. This further explained with reference to FIG. 3.

Figure 3:
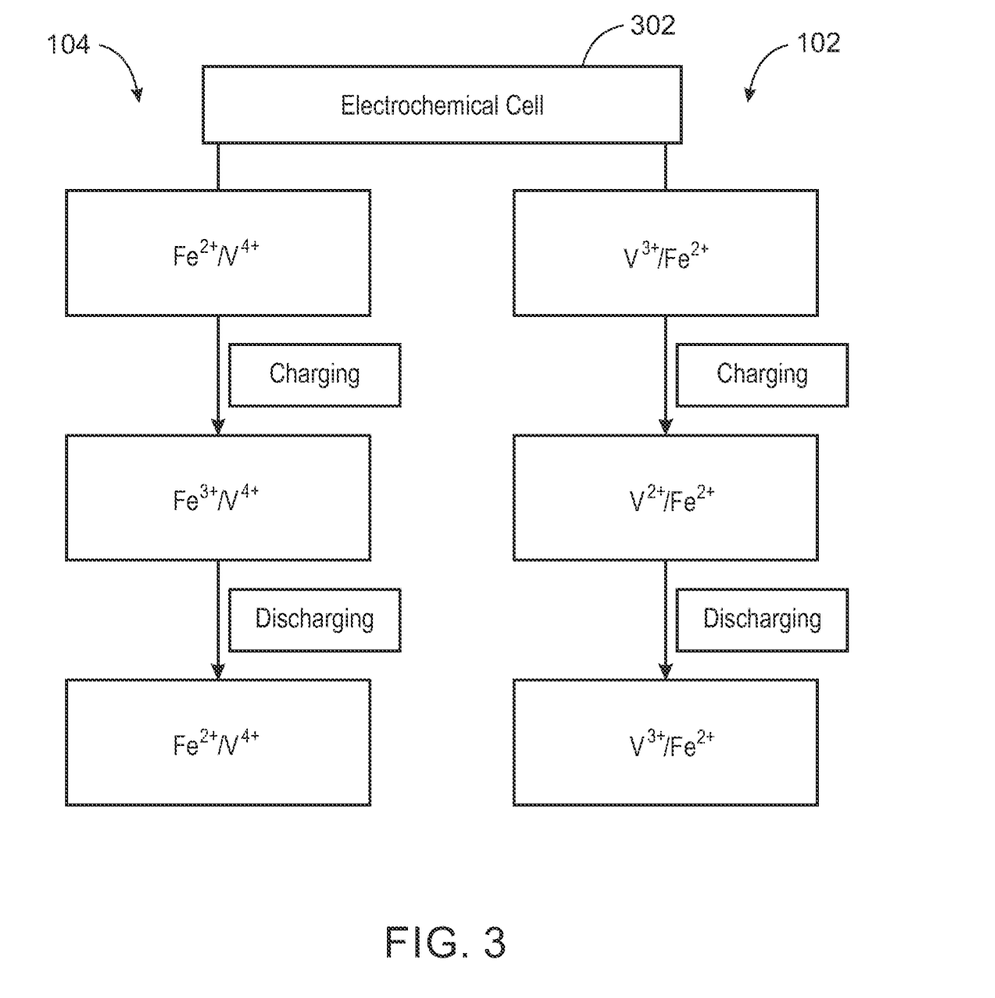
FIG. 3 is a schematic diagram of the operation of the charging and discharging of an electrochemical cell that includes the mixture of iron and vanadium ions in both catholyte and anolyte in equal volume ratios up to a charging voltage of 1.4 V.

FIG. 3 is a schematic diagram of the operation of the charging and discharging of an electrochemical cell 302 that includes the mixture of iron and vanadium ions in both catholyte 104 and anolyte 102 in equal volume ratios. In this example, the cell is charged at a voltage of 1.4 V. During charging, $Fe^{2+}$ is oxidized to $Fe^{3+}$ in the catholyte 104. In the anolyte 102, charging reduces $V^{3+}$ to $V^{2+}$. When charged at 1.4 V the vanadium ions in the catholyte 104 do not participate in the reaction. Also, the iron ions in the anolyte 102 do not participate in the reaction.

During discharging, the $Fe^{3+}$ ions in the catholyte 104 are reduced to $Fe^{2+}$ while the $V^{2+}$ ions in the anolyte 102 are oxidized to $V^{3+}$. As during charging, the iron ions in the anolyte 102 do not participate in the reaction.

Figure 4:
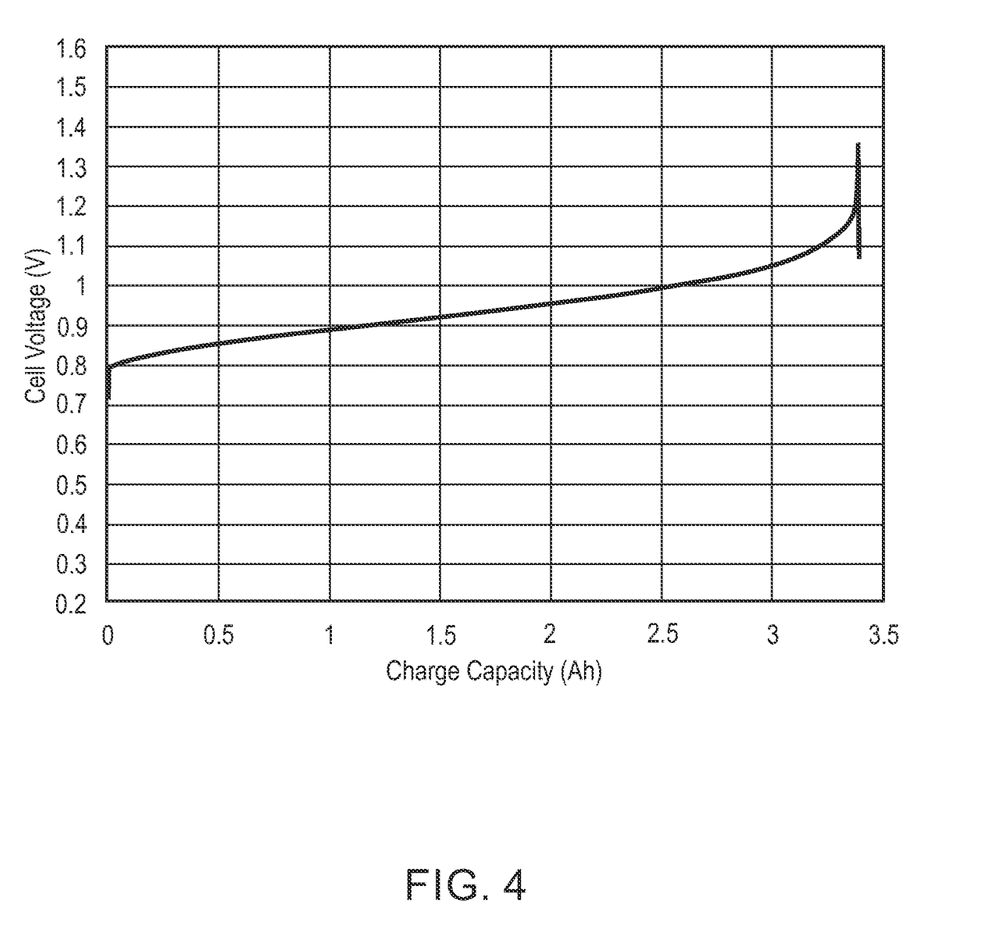
FIG. 4 is a plot of the performance of the flow cell battery of FIG. 3.

FIG. 4 is a plot of the charging performance of the flow cell battery of FIG. 3. The charging at 1.4 V provides a charge capacity of about 3.3 amp-hours (Ah).

Example 2: Mixed Fe/V Electrolyte with a Vanadium Utilization in the Catholyte of 50%

Figure 5:
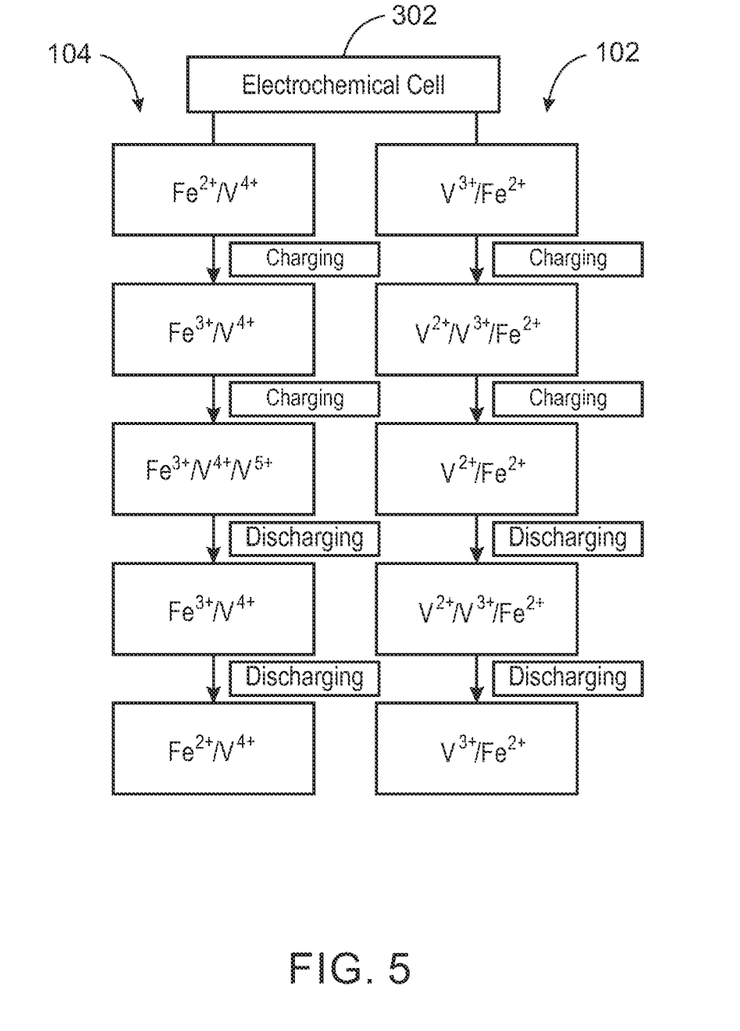
FIG. 5 is a schematic diagram of the operation of a flow cell battery that includes a mixture of iron and vanadium ions in both catholyte and anolyte showing operational changes resulting from a higher charging voltage and different volume ratios.

FIG. 5 is a schematic diagram of the operation of an electrochemical cell that includes a mixture of iron and vanadium ions in both catholyte 104 and anolyte 102 showing operational changes resulting from a higher charge voltage of 1.6 V. This increases the energy density of the flow cell battery. The increase in the energy density can be realized by increasing the reactant utilization in the electrolyte. Since the vanadium component is a more expensive component of the Fe/V flow battery system, the increase of vanadium utilization not only improves the energy density but also lowers the electrolyte cost.

To take advantage of the increased energy density in the catholyte 104, the catholyte/anolyte volume ratio was set at 2:3. Specifically, the catholyte 104 included two molar volumes of iron ions and two molar volumes of vanadium ions, for a total of four molar volumes. The anolyte 102 included three molar volumes of iron ions and three molar volumes of vanadium ions, for a total of six molar volumes. This provides a ⅜ savings on the total amount of vanadium used over a battery without mixed electrolytes.

In this example, during charging, $Fe^{2+}$ is first oxidized to $Fe^{3+}$ in the catholyte 104. After the $Fe^{2+}$ ions are completely oxidized, the $V^{4+}$ is oxidized to form a mixture of $V^{4+}$ and $V^{5+}$ ions. The charging is controlled to convert only 50 to 60% of the $V^{4+}$ ions to $V^{5+}$ ions. This retains the stability of the solution at higher temperatures, for example, decreasing the probability of precipitation of $V^{5+}$ ions at operational temperatures around 40° C. In the anolyte 102, charging reduces $V^{3+}$ to $V^{2+}$. As for example 1, the iron ions in the anolyte 102 do not participate in the reaction.

During discharging, the $V^{5+}$ ions in the catholyte 104 are first reduced to $V^{4+}$ ions. Once the $V^{5+}$ ions are reduced, the $Fe^{3+}$ ions in the catholyte 104 are reduced to $Fe^{2+}$. During discharging, the $V^{3+}$ ions in the anolyte 102 are reduced to $V^{2+}$. As during charging, the iron ions in the anolyte 102 do not participate in the reaction.

As a result of the higher charge voltage and the changes in volume ratio, more than 50% vanadium in the positive electrolyte (catholyte) could be utilized, and therefore a 30% improvement in the energy density of the Fe/V cell is achieved, compared to the Fe/V cell operated at a lower charging voltage, as described with respect to FIGS. 3 and 4.

Figure 6:
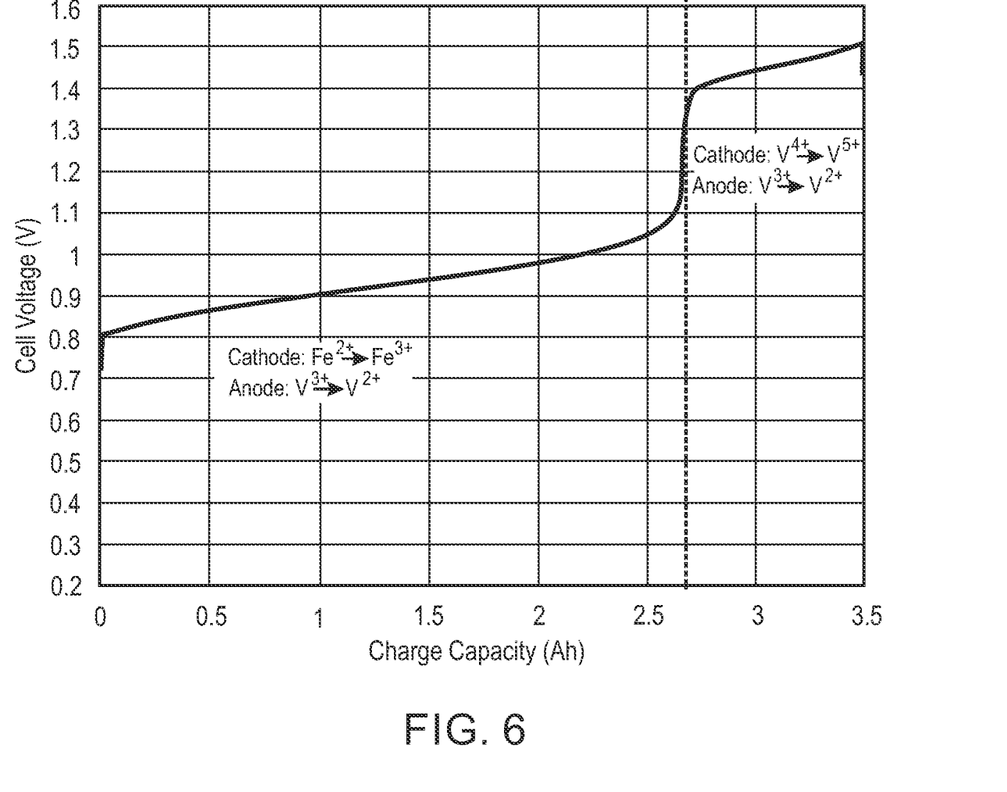
FIG. 6 is a plot of the performance of the electrochemical cell of FIG. 5.

FIG. 6 is a plot of the charging of the electrochemical cell of FIG. 5. This test was run with an electrolyte volume of 192 mL, using a NAFION® 212 membrane with an active area of 48 cm². The electrolyte used for both the anolyte and catholyte was 1.25 molar (M) V, 1.25 M Fe, 6.6 M Cl⁻, and 0.8 M $SO_4^{2-}$. During charging, $Fe^{2+}$ in the catholyte is oxidized to $Fe^{3+}$. Once all of the $Fe^{2+}$ has been converted, the higher charging voltage drives the oxidation of $V^{4+}$ in the catholyte to $V^{5+}$. As described herein, the charging is controlled to avoid less than about 60% of the $V^{4+}$ being converted to $V^{5+}$, increasing the thermal stability. In the anolyte, $V^{3+}$ is reduced to $V^{2+}$ during charging.

Figure 7:
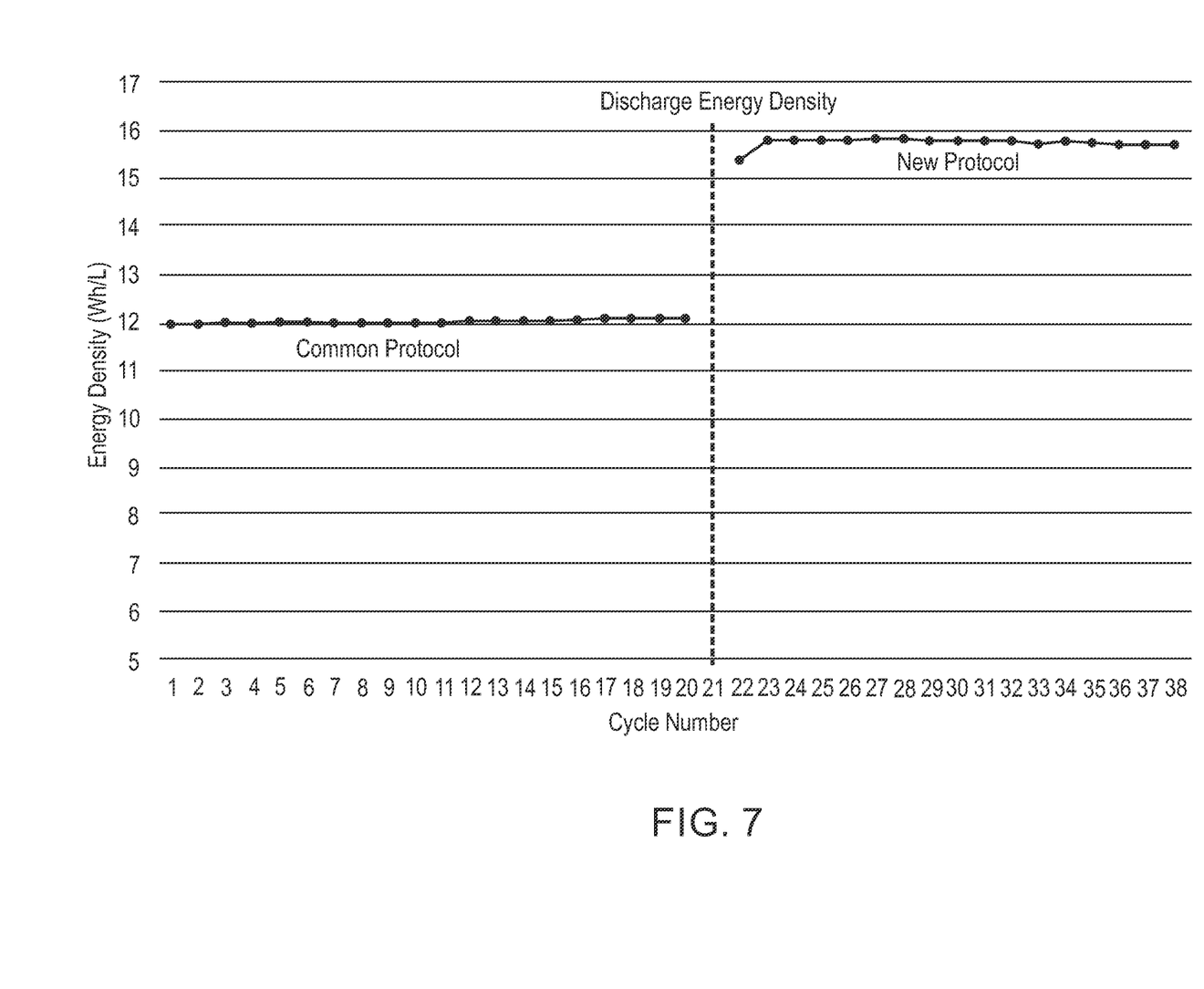
FIG. 7 is a plot of the energy density of the electrolytic cell comparing the two protocols over multiple charge/discharge cycles.

FIG. 7 is a plot of the energy density of the electrolytic cell comparing the two protocols over multiple charge/discharge cycles. In these tests, the catholyte, anolyte, and membrane are as described with respect to FIG. 6.

As described herein, the first, or common, protocol (FIGS. 3 and 4) uses a 1:1 volume ratio of catholyte to anolyte and generates a voltage up to 1.4 V. As shown in FIG. 7, the energy density of the common protocol is about 12 watthours per liter (Wh/l).

The new protocol (FIGS. 5 and 6) uses a higher volume ratio of 2:3 of the catholyte to the anolyte and generates a voltage up to 1.6 V. As shown in FIG. 7, the energy density of the new protocol is just under 16 Wh/l.

Figure 8:
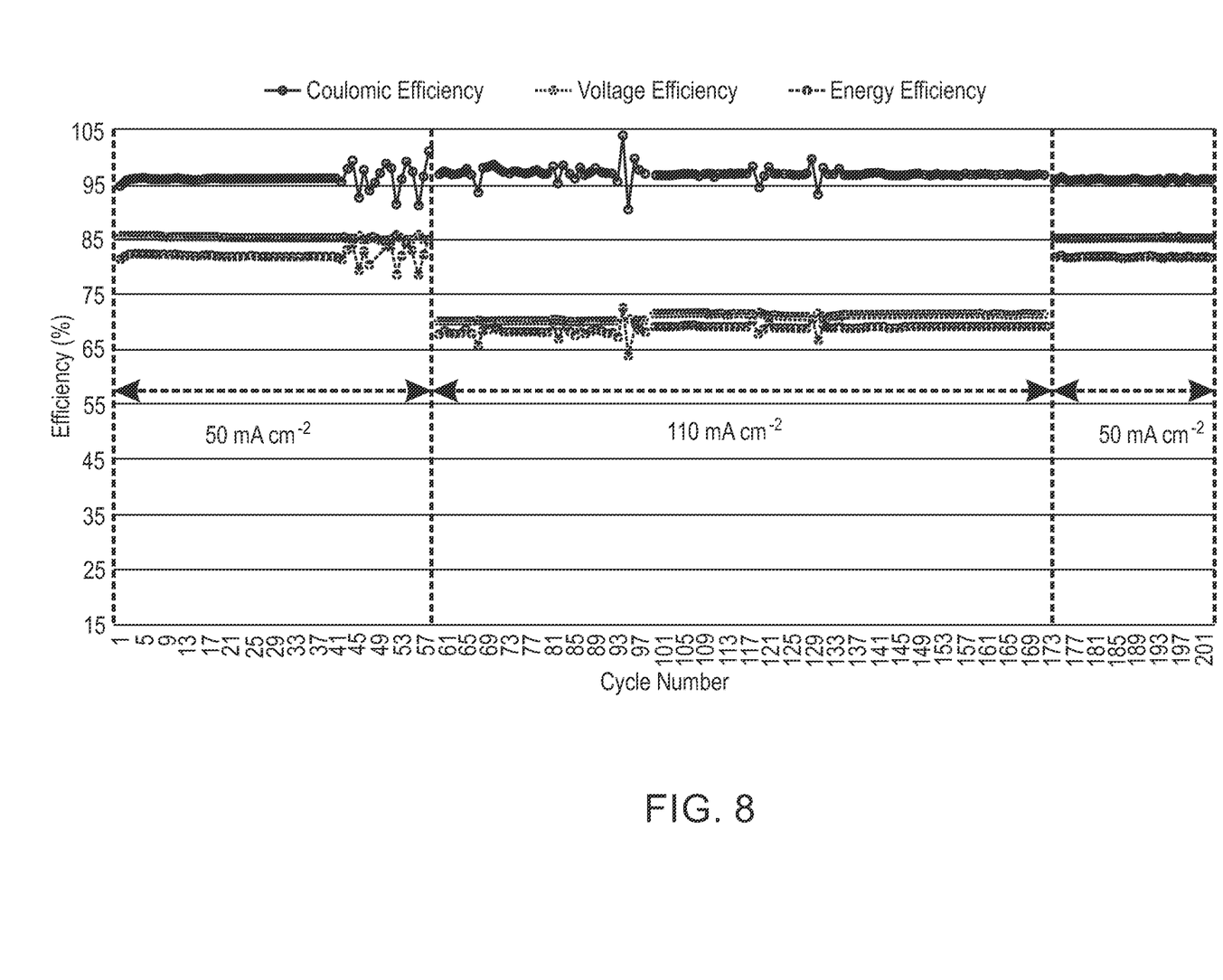
FIG. 8 is a plot of the cyclic efficiency of the Fe/V electrolytic cell through 200 cycles.

FIG. 8 is a plot of the cyclic efficiency of the Fe/V electrolytic cell through 200 cycles. The long-term cycling performance of an Fe/V redox flow cell using Fe/V mixed Cl⁻/$SO_4^{2-}$ electrolytes at both sides was tested. In these tests, the catholyte, anolyte, and membrane are as described with respect to FIG. 6. The coulombic, voltage and energy efficiencies remained constant over 200 cycles.

Figure 9:
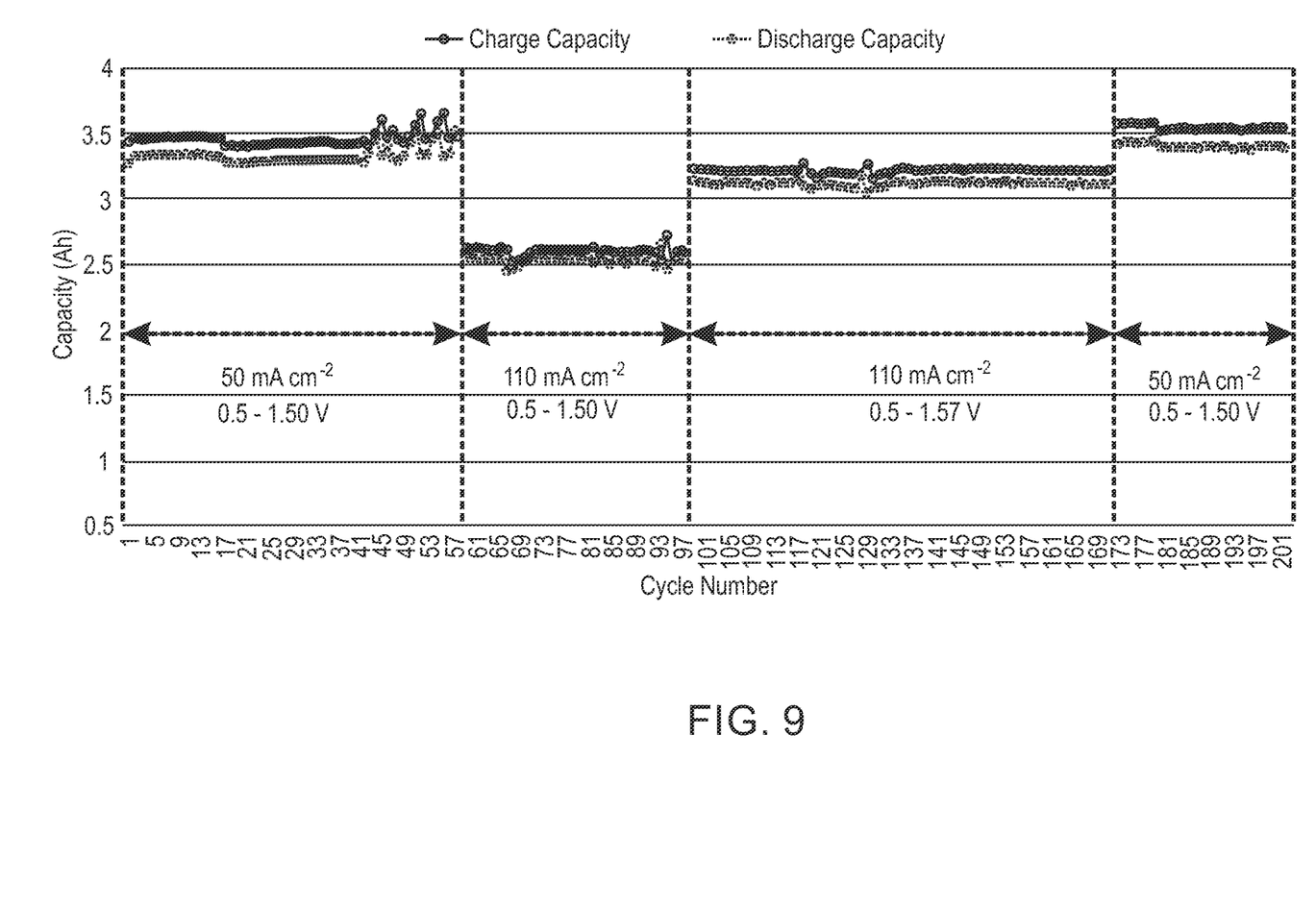
FIG. 9 is a plot of capacity of the Fe/V battery through 200 cycles.

FIG. 9 is a plot of capacity of the Fe/V battery through 200 cycles. The Fe/V cell also exhibited excellent capability retention, as shown in FIG. 9, with no obvious capacity loss throughout the 200 cycles. The discharge energy density also remained constant over 200 cycles indicating that the Fe/V flow battery is capable of operating reliably over a long term. The excellent stable performance of the Fe/V flow battery over extended cycling enables the system to operate with minimal system maintenance.

Embodiments

An embodiment described in examples herein provides a flow cell battery. The flow cell battery includes an electrochemical cell, wherein the electrochemical cell includes an ion exchange membrane, an anode current collector, and a cathode current collector. A space between the ion exchange membrane and the anode current collector forms a first channel, and a space between the ion exchange membrane and the cathode current collector forms a second channel. The ion exchange membrane is configured to allow ions to pass between the first channel and the second channel. The flow cell battery includes a first tank configured to flow an anolyte through the first channel at a first rate, and a second tank configured to flow a catholyte through the second channel at a second rate. The catholyte, or both the catholyte and the anolyte, includes a mixture of iron and vanadium ions.

In an aspect, the mixture is an equimolar mixture of iron and vanadium ions.

In an aspect, the first rate is greater than the second rate. In an aspect, a ratio between the first and the second rate is 3:2. In an aspect, the flow cell battery includes a pump configured to flow the anolyte through the first channel at the first rate and a pump to flow the catholyte through the second channel at the second rate.

In an aspect, the catholyte includes both vanadium ions and iron ions. In an aspect, the anolyte includes both vanadium ions and iron ions. In an aspect, the catholyte includes 1.25 molar (M) V, 1.25 M Fe, 6.6 M Cl⁻, and 0.8 M $SO_4^{2-}$. In an aspect, the catholyte is the same as the anolyte.

In an aspect, the anode current collector is a carbon-based electrode. In an aspect, the cathode current collector is a carbon-based electrode.

In an aspect, the first channel includes a porous electrode material. In an aspect, the porous electrode material is felt or Rainey nickel.

In an aspect, the second channel includes a porous electrode material. In an aspect, the porous electrode material is felt or Rainey nickel.

In an aspect, the flow cell battery includes a load connected between the anode current collector and the cathode current collector. In an aspect, the flow cell battery includes a power supply connected to the anode current collector and the cathode current collector.

In an aspect, the catholyte includes between 50% and 60% of the vanadium ions in a $V^{5+}$ oxidation state.

Another embodiment described in examples provides a method of producing electric current. The method includes flowing an anolyte through a first channel in an electrochemical cell, wherein the first channel is formed in the space between an anode current collector and an ion exchange membrane. A catholyte is flowed through a second channel in the electrochemical cell, wherein the second channel is formed in the space between a cathode current collector and the ion exchange membrane, wherein the first channel and the second channel are separated by an ion exchange membrane, and wherein the catholyte includes a mixed electrolyte including both iron and vanadium ions. Ions are flowed through the ion exchange membrane to oxidize the anolyte and reduce the catholyte. An electric current is generated between the anode current collector and the cathode current collector.

In an aspect, the method includes flowing the catholyte through the second channel at a rate that is 3/2 the rate of the flow of the anolyte through the first channel.

In an aspect, the method includes making the mixed electrolyte to include an equimolar solution of between about 1.25 molar (M) and 1.5 M vanadium ions and between about 1.25 M and 1.5 M iron ions, and using the mixed electrolyte as the catholyte. In an aspect, the method includes using the mixed electrolyte as the anolyte.

In an aspect, the method includes forming the mixed electrolyte to include about 6.6 M ions, and about 0.8 M $SO_4^{2-}$ ions.

Other implementations are also within the scope of the following claims.

What is claimed is:

1. A flow cell battery, comprising:
an electrochemical cell, wherein the electrochemical cell comprises:
an ion exchange membrane;
an anode current collector;
a cathode current collector, wherein a space between the ion exchange membrane and the anode current collector forms a first channel, a space between the ion exchange membrane and the cathode current collector forms a second channel, and wherein the ion exchange membrane is configured to allow ions to pass between the first channel and the second channel;
a first tank configured to flow an anolyte through the first channel at a first rate; and
a second tank configured to flow a catholyte through the second channel at a second rate, wherein the catholyte comprises 1.25 molar (M) V, 1.25 M Fe, 6.6 M Cl$^-$, and 0.8 M $SO_4^{2-}$.

2. The flow cell battery of claim 1, wherein the first rate is greater than the second rate.

3. The flow cell battery of claim 1, wherein a ratio between the first and the second rate is 3:2.

4. The flow cell battery of claim 1, further comprising a pump configured to flow the anolyte through the first channel at the first rate and a pump to flow the catholyte through the second channel at the second rate.

5. The flow cell battery of claim 1, wherein the anolyte comprises both vanadium ions and iron ions.

6. The flow cell battery of claim 1, wherein the catholyte is the same as the anolyte.

7. The flow cell battery of claim 1, wherein the anode current collector is a carbon-based electrode.

8. The flow cell battery of claim 1, wherein the cathode current collector is a carbon-based electrode.

9. The flow cell battery of claim 1, wherein the first channel comprises a porous electrode material.

10. The flow cell battery of claim 9, wherein the porous electrode material is felt or Rainey nickel.

11. The flow cell battery of claim 1, wherein the second channel comprises a porous electrode material.

12. The flow cell battery of claim 11, wherein the porous electrode material is felt or Rainey nickel.

13. The flow cell battery of claim 1, further comprising a load connected between the anode current collector and the cathode current collector.

14. The flow cell battery of claim 1, further comprising a power supply connected to the anode current collector and the cathode current collector.

15. The flow cell battery of claim 1, wherein the catholyte comprises between 50% and 60% of the vanadium ions in a $V^{5+}$ oxidation state.

16. A method of producing electric current, comprising:
flowing an anolyte through a first channel in an electrochemical cell, wherein the first channel is formed in the space between an anode current collector and an ion exchange membrane;
flowing a catholyte through a second channel in the electrochemical cell, wherein the second channel is formed in the space between a cathode current collector and the ion exchange membrane, wherein the first channel and the second channel are separated by an ion exchange membrane, and wherein the catholyte comprises a mixed electrolyte comprising iron ions vanadium ions, 6.6 M Cl$^-$ ions, and 0.8 M $SO_4^{2-}$ ions;
flowing ions through the ion exchange membrane to oxidize the anolyte and reduce the catholyte; and
generating an electric current between the anode current collector and the cathode current collector.

17. The method of claim 16, comprising flowing the catholyte through the second channel at a rate that is 3/2 the rate of the flow of the anolyte through the first channel.

18. The method of claim 16, comprising:
making the mixed electrolyte to comprise an equimolar solution of between 1.25 molar (M) and 1.5 M vanadium ions and between 1.25 M and 1.5 M iron ions; and
using the mixed electrolyte as the catholyte.

19. The method of claim 18, comprising using the mixed electrolyte as the anolyte.

* * * * *

UNITED STATES PATENT AND TRADEMARK OFFICE
CERTIFICATE OF CORRECTION

| | | |
|---|---|---|
| PATENT NO. | : 11,901,598 B2 | |
| APPLICATION NO. | : 17/651116 | |
| DATED | : February 13, 2024 | |
| INVENTOR(S) | : Ahmad D. Hammad et al. | |

It is certified that error appears in the above-identified patent and that said Letters Patent is hereby corrected as shown below:

In the Claims

Column 10, Line 37, Claim 16, after "ions" insert -- , --.

Signed and Sealed this
Twenty-fifth Day of June, 2024

Katherine Kelly Vidal
*Director of the United States Patent and Trademark Office*